United States Patent [19]
Batten

[11] 3,873,251

[45] Mar. 25, 1975

[54] APEX SEAL WITH VALVE CONTROLLED GAS PRESSURE BIAS

[75] Inventor: Cyril J. Batten, Romulus, Mich.

[73] Assignee: Ford Motor Company, Dearborn, Mich.

[22] Filed: Dec. 3, 1973

[21] Appl. No.: 421,471

[52] U.S. Cl. .............................. 418/123, 418/124
[51] Int. Cl. ...................... F01c 19/02, F04c 27/00
[58] Field of Search .......... 418/123, 124, 267, 268, 418/113, 119–122

[56] References Cited
UNITED STATES PATENTS

| | | | |
|---|---|---|---|
| 72,537 | 12/1867 | Pettit | 418/268 |
| 385,805 | 7/1888 | Gregersen et al. | 418/122 |
| 2,866,417 | 12/1958 | Nubling | 418/122 |
| 3,176,909 | 4/1965 | Maurhoff | 418/123 |

*Primary Examiner*—John J. Vrablik
*Attorney, Agent, or Firm*—Clifford L. Sadler; Keith L. Zerschling

[57] ABSTRACT

A sealing system for a rotary combustion engine according to the present invention includes an apex seal. The apex seal comprises an elongated seal member having a generally U-shape that fits within a seal receiving groove in the rotor of a rotary combustion engine. A tiltable valve is situated in the groove at the base of the seal. Means are provided for directing gas pressure from the chambers on the leading and trailing sides of the seal to the area at the base of the valve. The valve directs the dominant gas pressure to the base of the apex seal whereby it is urged radially outwardly into contact with the rotor housing.

10 Claims, 1 Drawing Figure

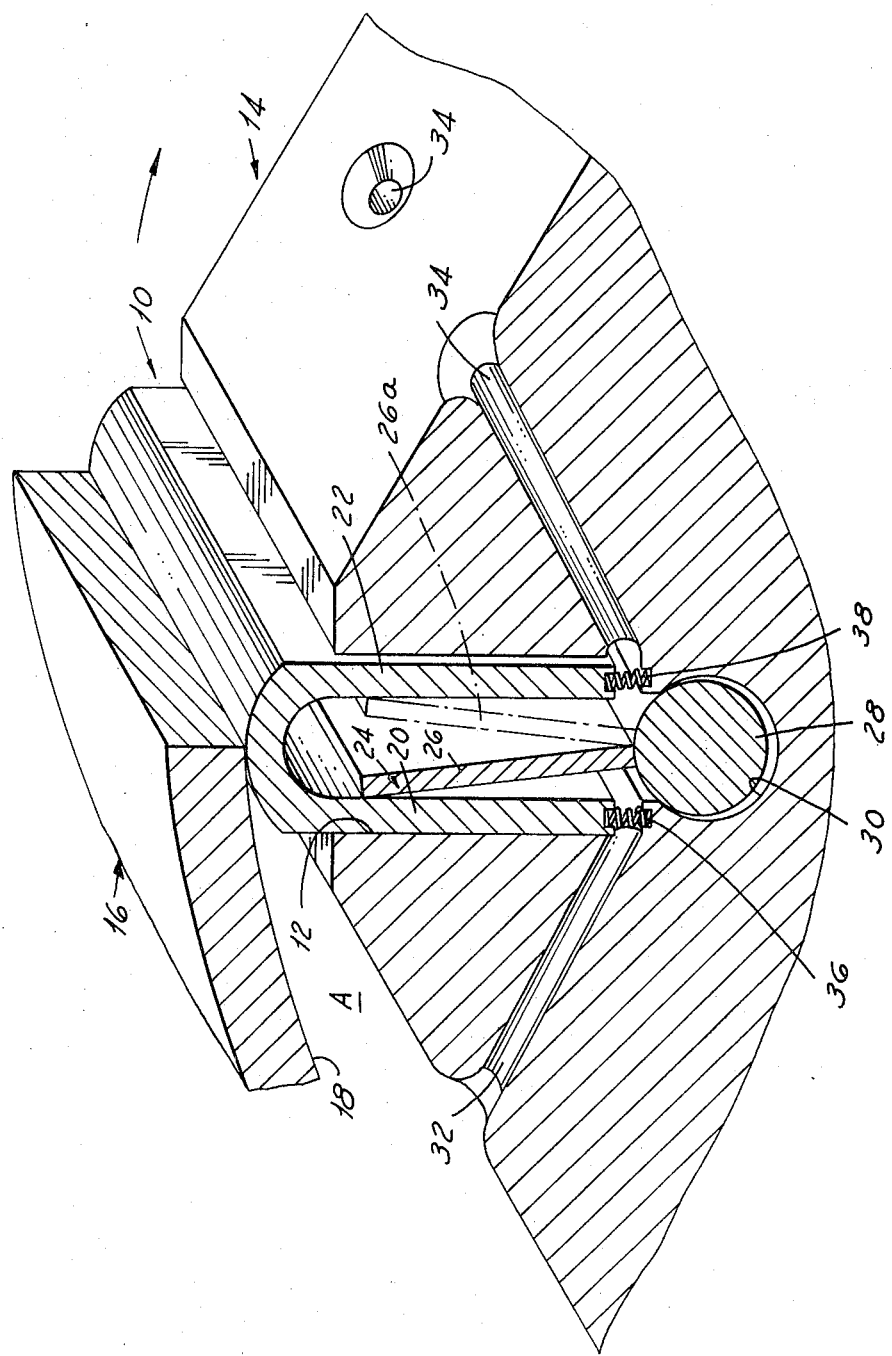

3,873,251

APEX SEAL WITH VALVE CONTROLLED GAS PRESSURE BIAS

BACKGROUND OF THE DISCLOSURE

The present disclosure relates to seals for rotary combustion engines, and more particularly, to an apex seal for a rotary engine having a trochoid rotor housing and a rotor of generally triangular shape fitted within the housing and eccentrically mounted on an eccentric shaft. In accordance with the present invention, an apex seal is provided that is characterized by its superior performance.

BRIEF SUMMARY OF THE DISCLOSURE

In the presently preferred embodiment of this invention, an apex seal is provided for a rotary combustion engine of the type having a cavity with a trochoid surface and a generally triangular shape rotor supported in the cavity on an eccentric portion of a shaft.

The seal comprises an elongated member having a U-shape in cross section. Iit is fitted within a seal receiving groove at one of the apexes of the rotor. The apex seal is interposed between two adjacent comubstion chambers. A vane type valve element is supported on a pivot pin at the base of the seal receiving groove. The vane is located within the U-shape seal and tiltable from side wall to side wall thereof.

Passages are provided in the rotor at either side of the apex seal to convey gas pressure from the two combustion chambers adjacent the seal to the area at the base of the seal. The dominant gas pressure will cause the vane to tilt in an appropriate direction to direct the pressure gas to the underside of the apex seal whereby the seal will be urged radially outwardly by gas pressure into engagement with the trochoid surface of the rotor housing.

Springs may be provided also to urge the apex seal outwardly. Such springs are useful during the starting of the engine before gas pressure is developed.

BRIEF DESCRIPTION OF THE DRAWINGS

The many objects and advantages of a seal system for a rotary combustion engine in accordance with this invention will become apparent upon consideration of the following detailed discussion and the accompanying drawings, in which the single FIGURE shows a unique apex seal in perspective.

DETAILED DESCRIPTION OF THE PREFERRED EMBODIMENT

An apex seal 10 for a rotary combustion engine that is constructed in accordance with the presently preferred embodiment of this invention is illustrated in the drawing.

A conventional rotary combustion engine includes a rotor housing having an internal surface that is machined to the shape of an epitrochoid. Housing end walls cooperate with the trochoid surface to provide an internal cavity. A generally triangular shape rotor or rotary piston is eccentrically mounted on a shaft that is rotatably supported within the housing. The apexes of the triangular rotor divide the interior of the cavity into three circumferentially spaced apart pressure chambers. The rotor revolves in a planetary fashion about the axis of the shaft and the volume of each chamber is dependent upon the angular position of the rotor in the cavity.

The conventional rotary engine includes a sealing system to ensure the integrity of the three pressure chambers. Such a sealing system provides gas-tight seals between the rotor and the end walls and trochoid surface of the housing. For this purpose, the system includes side seals, corner seals and apex seals all of which are carried by the rotor.

The apex seals are fitted into longitudinally extending seal receiving grooves at the apexes of the rotor and engage the trochoid surface. The corner seals are of generally cylindrical shape and are fitted within cylindrical recesses in the end faces of the rotor at each end of the apex seals. The corner seals are displaceable only axially in their recesses and engage the end walls of the rotor housing. The side seals are of strip form and extend between the corner seals. The seals fit within grooves in the end faces of the rotor.

The present invention is particularly directed to the construction of a unique apex seal assembly.

The apex seal 10 is an elongated member formed from a hard material. The seal 10 fits within a groove 12 that is located at one of the apexes of a generally triangular shape rotary piston or rotor 14. The groove parallels the axis of rotation of the rotor 14. The rotor 14 is rotatably supported on an eccentric portion of a shaft rotatably supported within the housing 16. The rotor 14 is constructed to rotate in the direction of the arrow.

The housing 16 has a trochoid surface 18. A pair of side walls cooperate with the trochoid surface 18 to define a cavity within which the rotor 14 rotates.

The apex seal 10 has a width that is only slightly less than the width of the groove 12. It protrudes radially from the groove 12 by an amount that is approximately equal to the clearance between the apex portion of the rotor 14 and the trochoid surface 18. The seal 10 engages the trochoid surface 18 and, thereby, helps to define the limits of adjacent pressure chambers A and B within the housing. Chamber B is on the leading side of the seal 10 and chamber A is on the trailing side.

As seen in the drawing FIGURE, the seal 10 has a generally U-shape with side walls or let portions 20 and 22 that extend radially inwardly along the walls of the groove 12.

Means are provided for utilizing gas pressure to urge the seal 10 outwardly into engagement with the trochoid surface 18. A valve assembly 24 is situated in the groove 12. The valve 24 includes a vane type valve element 26 that is located between the legs or side walls 20 and 22 of the U-shape apex seal. The vane 26 is connected to a pivot pin 28 that is situated in a cylindrical recess portion 30 of the groove 12. The rotor 14 is provided with a series of holes 32 that extend inwardly from the surface of the rotor 14 adjacent the chamber A to the base of the apex seal 10. Similarly, passages 34 are drilled in the rotor 14 to proviide comunication between the chamber B and the base of the apex seal 10.

OPERATION

The described seal system operates in the following manner. As the rotor 14 revolves in a planetary fashion within the housing 16, the pressures within chambers A and B will vary greatly. Assuming that the pressure in chamber B exceeds the pressure in chamber A, the valve element 24 will be disposed in the position shown in the drawing in solid lines. Under these circumstances, gas pressure will be communicated through the passages 34 to the base of the apex seal 10 and to the right side of the vane element 26. Gas pressure in chamber A will be communicated through passage 32 to the left side of the vane 26. In view of the assumption that the pressure in chamber B exceeds the pressure in chamber A, the vane 26 will be disposed in a left-hand direction in engagement with the left leg or side wall 20 of the seal 10. The entire underside of the interior of the U-shape apex seal 10 will be subjected to the higher gas pressure of chamber B and the seal 10 will be urged radially outwardly into sealed engagement with the trochoid surface 18.

At a later phase in the rotation of the rotor 14, the gas pressure in chamber A may exceed the pressure in chamber B. Under these circumstances, the greater pressure of chamber A will be communicated through the passage 34 to the left side of the vane 26, thereby causing the vane 26 to pivot to the right to the dotted-line position identified by reference numeral 26a. When the pressure in chamber A exceeds the pressure in chamber B, the vane 26 will rest against the leg or side wall 22 of the U-shape apex seal 10. The pressure of chamber A then will be in a position to force the seal 10 radially outwardly into sealed engagement with the trochoid surface 18.

The valve 24 performs two principal functions. The upper edge of the vane 26 is in sealed engagement with the interior surface of one of the leg portions 20 or 22 of seal 10 depending upon whether it is in the solid line position or the dotted line position 26i a. This sealed engagement provides a portion of the isolation of chamber A from chamber B. In addition, the valve 24 functions to direct gas pressure to the underside of the seal to urge it radially outwardly in response to the greater of the pressures in chambers A and B.

The valve 24 may be of lighweight construction because it does not function as a rubbing seal. As a consequence, the valve 24 is very responsive to changes in pressure in the cambers A and B. There is a minimum of lag in moving the vane 26 from the full line position to the dotted line position 26 or vice versa. Therefore, there is only minimum leakage of gas around the vane 26 as it shifts its position.

The principal means for maintaining the seal 10 in engagement with the trochoid surface 18 is the gas pressure in either chamber A or B. In order to provide a sealed engagement between the apex seal 10 and the surface 18 during start-up, springs 36 and 38 may be provided between the innder edges of the seal legs 20 and 22 and ledges formed at the base of the seal receiving groove 12. These springs are shown in the drawing as small coil springs, however, they may be of leaf spring construction, if desired.

It is contemplated that the apex seal 10 will cooperate with a pair of corner seals as described above. In a conventional fashion, the corner seals are seated in recesses formed on the end walls of the rotor 14 at eigher end of the groove 12.

The foregoing description presents the presently preferrred embodiment of this invention. Modifications and alterations may occur to those skilled in the art that will come within the scope and sprirrt of the following claims.

I claim:

1. A rotary mechanism comprising a housing having a trochoid surface,
a rotor disposed in said housing,
said rotor and said trochoid surface defining portions of two adjacent pressure chambers,
said rotor having an apex groove,
an apex seal disposed in said groove and interposed between said pressure chambers,
said apex seal having one surface engaging said trochoid surface,
said seal comprising an elongated member having a vacant interior portion,
a valve means disposed in said interior portion,
two passage means constructed to provide mutually independent communication between said two pressure chambers and two sides of said valve means, respectively,
said valve means being constructed to direct gas pressure from the one of said two pressure chambers that has the higher pressure to an area in said apex seal whereby said seal is urged radially outwardly in response to said gas pressure.

2. A rotary mechanism according to claim 1 and including:
said apex seal having a pair of spaced apart side walls slidably engaging the sides of said groove,
said valve means including a pressure responsive valve element disposed between said side walls.

3. A sealing system for a rotary mechanism comprising a housing having a trochoid surface,
a rotor disposed in said housing,
said rotor and said trochoid surface defining portions of first and second pressure chambers,
said rotor having an apex groove,
an apex seal disposed in said groove and having a rubbing surface engaging said trochoid surface,
said seal being interposed between said first and second pressure chambers,
said sea being of elongated construction and having spaced apart walls extending radially inwardly in slidable engagement with the side surfaces of said groove,
a pressure responsive valve means disposed in said groove and situated between said walls of said seal,
said valve beind displaceable from a first position where it engages one of said walls to a second position where it engages the other of said walls,
first communication means providing communication between said first chamber and one side of said valve,
second communication means providing communication between said second chamber and the other side of said valve,
said first and second communication means being mutually exclusive,
said valve means being constructed to direct gas pressure from the one of said first and second pressure chambers that has the higher pressure to an area of said apex seal whereby said seal is urged radially outwardly into engagement with said trochoid surface in response to the pressure of the gas in said one chamber.

4. A sealing system for a rotary mechanism according to claim 3 and including:
said first and second communication means being formed in said rotor.

5. A sealing system for a rotary mechanism according to claim 3 and including:
said valve means comprising a vane type element pivotally supported in said groove.

6. A sealing system for a rotary combustion engine comprising a housing having a trochoid surface,
a rotor disposed in said housing,
said rotor and said trochoid surface defining portions of first and second pressure chambers,
said rotor having an apex groove,
an apex seal disposed in said groove and having a rubbing surface engaging said trochoid surface,
said seal being interposed between said first and second pressure chambers,
said seal being of elongated construction and having spaced apart walls extending radially inwardly in slidable engagement with the side surfaces of said groove,
a vane type valve pivotally supported in said groove and having a vane portion situated between said walls of said seal,
said valve being tiltable from a first position where it engages one wall to a second position where it engages the other wall,
first communication means providing communication between said first chamber and one side of said vane portion,
second communication means providing communication between said second chamber and the other side of said van portion,
said first and second communication means being mutually exclusive,
said valve being constructed to direct gas pressure from the one of said first and second pressure chambers that has the higher pressure to an area of said apex seal whereby said seal is urged radially outwardly into engagement with said trochoid surface in response to the pressure of the gas in said one chamber.

7. A sealing system for a rotary combustion engine according to claim 6 and including:
said communication means comprising a plurality of holes formed in said rotor.

8. A sealing system for a rotary combustion engine according to claim 6 and including:
said vane portion being connected to a pivot pin portion rotatably supported at the base of said groove.

9. A sealing system for a rotary combustion engine according to claim 6 and including:
said communication means comprising a plurality of holes formed in said rotor,
said vane portion being connected to a pivot pin portion rotatably supported at the base of said groove.

10. A sealing system for a rotary combustion engine comprising a housing having a trochoid surface,
a rotor disposed in said housing,
said rotor and said trochoid surface defining portions of first and second pressure chambers,
said rotor having an apex groove,
an apex seal disposed in said groove and having a rubbing surface engaging said trochoid surface,
said seal being interposed between said first and second pressure chambers,
said seal being an elongated construction and having a generally U shape in cross section,
said seal having spaced apart walls extending radially inwardly in slidable engagement with the side surfaces of said groove,
a vane type valve pivotally supported in said groove and having a vane portion situated betweed said walls of said seal,
said valve being tiltable from a first position where it engages one wall to a second position where it engages the other wall,
said rotor having first communication means formed therein and constructed to provide communication between said first chamber and one side of said vane portion,
said rotor having second communication means formed therein and constructed to provide communication between said second chamber and the other side of said vane portion,
said first and second communication means being mutually exclusive,
said valve being constructed to direct gas pressure from the one of said first and second pressure chambers that has the higher pressure to the area of said apex seal between said spaced walls whereby said seal is urged radially outwardly into engagement with said trochoid surface in response to the pressure of the gas in said one chamber.

* * * * *